(12) United States Patent
Kochura et al.

(10) Patent No.: US 11,822,599 B2
(45) Date of Patent: Nov. 21, 2023

(54) VISUALIZATION RESONANCE FOR COLLABORATIVE DISCOURSE

(71) Applicant: International Business Machines Corporation, Armonk, NY (US)

(72) Inventors: Nadiya Kochura, Bolton, MA (US); Jonathan D. Dunne, Dungarvan (IE); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 17/123,461

(22) Filed: Dec. 16, 2020

(65) Prior Publication Data

US 2022/0188349 A1    Jun. 16, 2022

(51) Int. Cl.
*G06F 16/00* (2019.01)
*G06F 16/583* (2019.01)
*G06F 16/93* (2019.01)
*G06N 20/00* (2019.01)

(52) U.S. Cl.
CPC .......... *G06F 16/5846* (2019.01); *G06F 16/93* (2019.01); *G06N 20/00* (2019.01)

(58) Field of Classification Search
CPC .... G06F 16/93; G06F 16/5846; G06F 16/316; G06F 16/353; G06F 16/5866
USPC ....................................................... 707/749
See application file for complete search history.

(56) References Cited

U.S. PATENT DOCUMENTS

| | | | | |
|---|---|---|---|---|
| 7,653,814 | B2 * | 1/2010 | Carro ...................... | G06F 21/64 713/180 |
| 7,739,279 | B2 * | 6/2010 | Van Den Berg ........ | G06F 40/35 707/750 |
| 7,895,208 | B2 * | 2/2011 | Konopnicki ........ | G06F 16/9535 707/738 |
| 8,145,677 | B2 | 3/2012 | Al-Shameri | |
| 8,990,128 | B2 * | 3/2015 | He ....................... | G06F 18/2431 706/12 |
| 9,195,808 | B1 * | 11/2015 | Nestler ................. | G06F 21/121 |
| 9,373,029 | B2 * | 6/2016 | Hull ...................... | G06V 30/412 |
| 9,530,050 | B1 * | 12/2016 | Erol ...................... | G06F 16/434 |
| 10,032,046 | B1 * | 7/2018 | Hayashi .............. | H04L 63/0245 |
| 10,129,211 | B2 * | 11/2018 | Heath ................... | G06Q 30/02 |
| 10,235,720 | B2 * | 3/2019 | Abraham ............... | G06Q 40/12 |
| 10,742,588 | B2 * | 8/2020 | DeLuca ................. | G06N 20/00 |
| 10,871,877 | B1 * | 12/2020 | Clediere ............... | G06Q 50/01 |

(Continued)

OTHER PUBLICATIONS

Harrison, A. et al., "Teaching and Learning with Analogies: Friend or Foe", Published 2006, pp. 1/1, <https:www.semanticscholar.org/paper/Teaching-and-learning-with-analogies-%3A-friend-or-Harrison-Treagust/8518367cclef090ea263c39e912a4acaf59dd3d5?p2df>.

(Continued)

*Primary Examiner* — Mariela Reyes
*Assistant Examiner* — Rezwanul Mahmood
(74) *Attorney, Agent, or Firm* — Stephanie L. Carusillo

(57) ABSTRACT

In an approach to collaborative discourse, responsive to receiving a collaborative discourse, a document corpora of the collaborative discourse is analyzed. A picture metadata is analyzed for each image in a graphic repository. A machine learning model is derived based on the analysis of the document corpora and the analysis of the picture metadata. Appropriate images are selected from the graphic repository based on the machine learning model, where the appropriate images closely align with the collaborative discourse.

15 Claims, 7 Drawing Sheets

(56) References Cited

U.S. PATENT DOCUMENTS

| | | | | |
|---|---|---|---|---|
| 11,042,700 | B1* | 6/2021 | Walters | G06N 20/00 |
| 11,176,311 | B1* | 11/2021 | Lorenzo | G06F 40/117 |
| 11,361,594 | B1* | 6/2022 | Copeland | G05D 1/0088 |
| 11,483,170 | B1* | 10/2022 | Carbune | H04L 12/1822 |
| 11,558,471 | B1* | 1/2023 | Swift | H04L 65/402 |
| 2001/0046069 | A1* | 11/2001 | Jones | H04L 51/212 |
| | | | | 358/402 |
| 2003/0103071 | A1* | 6/2003 | Lusen | G06F 40/169 |
| | | | | 715/705 |
| 2005/0157330 | A1* | 7/2005 | Giuliano | G06F 3/1282 |
| | | | | 358/1.15 |
| 2005/0162689 | A1* | 7/2005 | Roztocil | G06F 3/1203 |
| | | | | 358/1.15 |
| 2007/0143098 | A1* | 6/2007 | Van Den Berg | G06F 40/35 |
| | | | | 704/1 |
| 2008/0017722 | A1* | 1/2008 | Snyder | G06Q 10/00 |
| | | | | 235/494 |
| 2008/0104118 | A1* | 5/2008 | Pulfer | G06F 16/285 |
| 2009/0285444 | A1* | 11/2009 | Erol | G06V 30/413 |
| | | | | 382/229 |
| 2010/0125523 | A1* | 5/2010 | Solomon | G06Q 30/02 |
| | | | | 715/201 |
| 2011/0090527 | A1* | 4/2011 | Nakashio | H04N 1/00867 |
| | | | | 358/1.14 |
| 2011/0173141 | A1* | 7/2011 | Campbell | G06F 16/48 |
| | | | | 715/230 |
| 2011/0178981 | A1* | 7/2011 | Bowen | G06Q 10/00 |
| | | | | 707/E17.008 |
| 2011/0276924 | A1 | 11/2011 | Voonna | |
| 2012/0296920 | A1* | 11/2012 | Sahni | H04L 67/535 |
| | | | | 707/E17.014 |
| 2013/0041896 | A1* | 2/2013 | Ghani | G06F 16/3328 |
| | | | | 707/E17.014 |
| 2013/0155068 | A1 | 6/2013 | Bier | |
| 2014/0195899 | A1* | 7/2014 | Bastide | G06F 40/166 |
| | | | | 715/256 |
| 2014/0208418 | A1* | 7/2014 | Libin | G06F 21/6209 |
| | | | | 726/19 |
| 2014/0236720 | A1* | 8/2014 | Shunock | G06Q 30/02 |
| | | | | 705/14.54 |
| 2014/0280232 | A1* | 9/2014 | Chidlovskii | G06F 16/48 |
| | | | | 707/749 |
| 2014/0344191 | A1* | 11/2014 | Lebow | G06N 5/02 |
| | | | | 706/11 |
| 2015/0067048 | A1* | 3/2015 | Kannan | G06Q 50/01 |
| | | | | 709/204 |
| 2015/0154232 | A1* | 6/2015 | Ovsjanikov | G06F 16/5838 |
| | | | | 707/780 |
| 2015/0195330 | A1* | 7/2015 | Lee | H04L 67/02 |
| | | | | 709/204 |
| 2015/0310128 | A1* | 10/2015 | Brav | G06F 16/9024 |
| | | | | 707/800 |
| 2015/0314454 | A1* | 11/2015 | Breazeal | G10L 15/32 |
| | | | | 700/259 |
| 2017/0034107 | A1* | 2/2017 | Krishnaswamy | G06F 7/08 |
| 2017/0091208 | A1* | 3/2017 | Quan | G06F 16/00 |
| 2017/0132287 | A1* | 5/2017 | Greiff | G06F 16/5866 |
| 2017/0206064 | A1* | 7/2017 | Breazeal | B25J 11/0005 |
| 2017/0220536 | A1* | 8/2017 | Chiba | G06F 9/453 |
| 2017/0329943 | A1* | 11/2017 | Choi | H04L 63/10 |
| 2017/0364537 | A1* | 12/2017 | Kariman | G06Q 10/0637 |
| 2018/0204111 | A1* | 7/2018 | Zadeh | G06V 10/764 |
| 2018/0246983 | A1* | 8/2018 | Rathod | G06F 16/972 |
| 2018/0249037 | A1* | 8/2018 | Shono | H04N 1/32149 |
| 2018/0329990 | A1* | 11/2018 | Severn | G06V 10/764 |
| 2019/0138667 | A1* | 5/2019 | Benesh | G06Q 50/08 |
| 2019/0147103 | A1* | 5/2019 | Bhowan | G06V 10/454 |
| | | | | 707/737 |
| 2019/0171986 | A1* | 6/2019 | Beznos | G06Q 10/0635 |
| 2019/0180094 | A1* | 6/2019 | Zagaynov | G06V 30/40 |
| 2019/0244113 | A1* | 8/2019 | Ramos | G06N 3/08 |
| 2019/0272071 | A1* | 9/2019 | Greenberger | G06F 16/93 |
| 2019/0279164 | A1* | 9/2019 | Byron | G06F 16/2457 |
| 2019/0318212 | A1* | 10/2019 | Govrin | G06T 3/40 |
| 2019/0325012 | A1* | 10/2019 | Delaney | G06F 40/279 |
| 2019/0332709 | A1* | 10/2019 | Peng | G06F 16/9577 |
| 2019/0385089 | A1* | 12/2019 | Saha | G06N 20/00 |
| 2020/0042837 | A1* | 2/2020 | Skinner | G06F 18/217 |
| 2020/0076746 | A1 | 3/2020 | Penrose | |
| 2020/0167099 | A1* | 5/2020 | Haba | G06F 3/128 |
| 2020/0184278 | A1* | 6/2020 | Zadeh | G06N 3/044 |
| 2020/0201816 | A1* | 6/2020 | Sexton | G06Q 50/18 |
| 2020/0293160 | A1* | 9/2020 | Soyarslan | G06F 3/0482 |
| 2020/0302021 | A1* | 9/2020 | Poling | G06F 40/30 |
| 2020/0389334 | A1* | 12/2020 | Kochura | H04L 12/1831 |
| 2021/0026897 | A1* | 1/2021 | Rathje | G06F 16/90332 |
| 2021/0027645 | A1* | 1/2021 | Nicol | H04L 67/131 |
| 2021/0064692 | A1* | 3/2021 | Srinivasan | G06F 40/56 |
| 2021/0073937 | A1* | 3/2021 | Werner | H04N 1/4074 |
| 2021/0081566 | A1* | 3/2021 | Broudou | G06N 5/022 |
| 2021/0082062 | A1* | 3/2021 | Hurd | G06N 20/00 |
| 2021/0125104 | A1* | 4/2021 | Christiansen | G06N 20/10 |
| 2021/0133681 | A1* | 5/2021 | Dhaliwal | G06Q 10/101 |
| 2021/0150338 | A1* | 5/2021 | Semenov | G06F 18/24765 |
| 2021/0182020 | A1* | 6/2021 | Kanuganti | G06F 3/167 |
| 2021/0209353 | A1* | 7/2021 | Miller | G06F 40/30 |
| 2021/0263971 | A1* | 8/2021 | Landes | G06F 16/9024 |
| 2021/0273992 | A1* | 9/2021 | Kochura | H04L 9/3239 |
| 2021/0279349 | A1* | 9/2021 | Martino | G06F 21/6227 |
| 2021/0329143 | A1* | 10/2021 | Abe | H04N 1/32133 |
| 2021/0350391 | A1* | 11/2021 | Tsai | G06Q 30/0643 |
| 2021/0357512 | A1* | 11/2021 | Busila | G06F 21/60 |
| 2021/0383338 | A1* | 12/2021 | Gupta | G06Q 10/10 |
| 2021/0397737 | A1* | 12/2021 | De Berker | G06V 30/19167 |
| 2022/0092198 | A1* | 3/2022 | Afroz | G06F 21/602 |
| 2022/0121884 | A1* | 4/2022 | Zadeh | G06V 10/764 |
| 2022/0188349 | A1* | 6/2022 | Kochura | G06N 5/022 |
| 2022/0222429 | A1* | 7/2022 | Silverstein | G06Q 10/101 |
| 2022/0301020 | A1* | 9/2022 | Jiang | G06Q 30/0282 |
| 2022/0309815 | A1* | 9/2022 | Hamaguchi | G06V 30/12 |
| 2022/0374190 | A1* | 11/2022 | Rothera | H04M 7/0027 |
| 2023/0100862 | A1* | 3/2023 | Varghese | H04L 65/1089 |
| | | | | 345/2.2 |
| 2023/0153347 | A1* | 5/2023 | Shunock | G06Q 30/02 |
| | | | | 705/14.54 |
| 2023/0154285 | A1* | 5/2023 | Cohn | G07F 17/3244 |
| | | | | 463/20 |

OTHER PUBLICATIONS

Kanthan et al., "Using Metaphors, Analogies and Similes as Aids in Teaching Pathology to Medical Sutdents", IAMSE, International Association of Medical Science Educators, vol. 16, No. 1, pp. 1-12, Accessed Sep. 28, 2020, <http://www.iamse.org/volume/volume-16-no-1/>.

Losada, B., "A Formalization for Mapping Discourses from Business-Based Technical Documents into Controlled Language Texts for Requirements Elicitation", Universidad Nacional De Colombia, Octubre de 2014, Ph.D. Thesis, pp. 1-124.

Newby et al., "Instructional Analogies and the Learning of Concepts", SpringerLink, ETR&D 43, 5-18, Published Mar. 1995, pp. 1-18, <https://link.springer.com/article/10.1007/BF02300478>.

Sarina et al., "Nonmath Analogies in Teaching Mathematics", ScienceDirect, 1877-0428 © 2010 Published by Elsevier Ltd. Jan. 25, 2010, pp. 1-6, doi:10./1010j.sbspro.2010.03.937, <www.sciencedirect.com>.

Truica et al., "Comparing Different Term Weighting Schemas for Topic Modeling", Computer Science and Engineering Dept., Sep. 2016, DOI: 10.1109/SYNASC.2016.055, pp. 1-5, <https://www.researchgate.net/publication/310426043>.

Zund et al., "Story Version Control and Graphical Visualization for Collaborative Story Authoring", acm isbn 978-1-4503-5329-Aug. 17, 2012, pp. 1-10, <https://doi.org/10.1145/3150165.3150175>.

* cited by examiner

VISUALIZATION RESONANCE FOR COLLABORATIVE DISCOURSE

BACKGROUND

The present invention relates generally to the field of content categorization, and more particularly to visualization resonance for collaborative discourse.

A discourse is defined as a communication of thought by words or a formal discussion of a subject in speech or writing, as a dissertation or treatise. In linguistics, a discourse is any unit of connected speech or writing longer than a sentence. A collaborative discourse refers to the human interaction in which participants share knowledge of communicative codes and subject matters.

Visualization is the representation of an object, situation, or set of information as a chart or other image. Visualization is any technique for creating images, diagrams, or animations to communicate a message. Visualization through visual imagery has been an effective way to communicate both abstract and concrete ideas since the dawn of humanity. Visualization resonance is the power or the effect of bringing the underlying data into the mind of the viewer through the medium of a visualization.

SUMMARY

Embodiments of the present invention disclose a method, a computer program product, and a system for visualization resonance for collaborative discourse. In one embodiment, responsive to receiving a collaborative discourse, a document corpora of the collaborative discourse is analyzed. A picture metadata is analyzed for each image in a graphic repository. A machine learning model is derived based on the analysis of the document corpora and the analysis of the picture metadata. Appropriate images are selected from the graphic repository based on the machine learning model, where the appropriate images closely align with the collaborative discourse.

DETAILED DESCRIPTION

Figure 1:
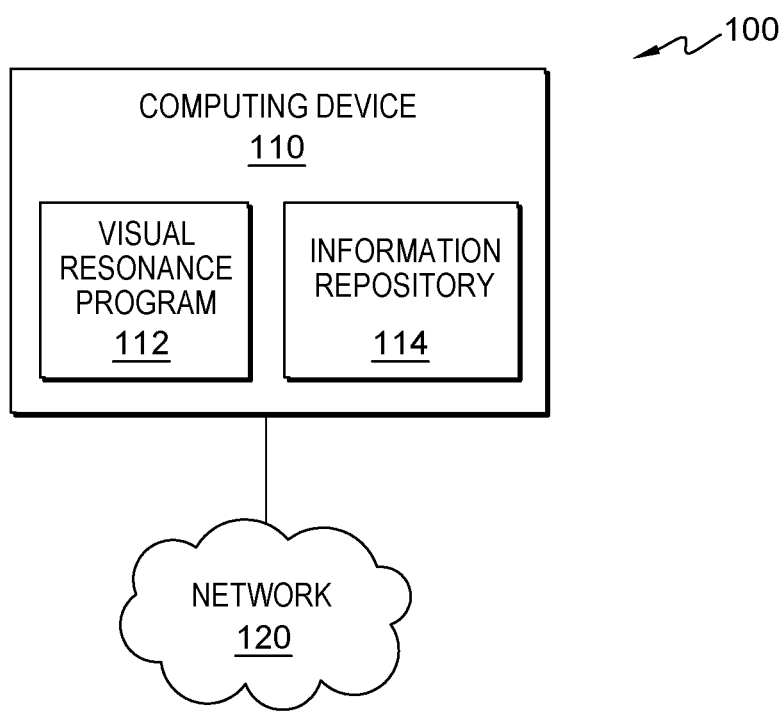
FIG. 1 is a functional block diagram illustrating a distributed data processing environment, in accordance with an embodiment of the present invention.

Online collaborative content categorization uses many visualization techniques such as icons to bring user attention to written discourse. Using visuals in marketing campaigns is very effective in communicating an idea or point of view, as the image tagging proves to be effective in creating the association between similar concepts. This is due in part to the way human memory works. If an image is favorable to the reader, this image is transferred to their iconic memory, a process that takes mere milliseconds. Thereafter, the image (and idea) gets transferred to a user's visual working memory and finally to the user's long-term memory. Problems arise when selecting the optimal image to help convey a story in the medium of social discourse. Is there a singular image or a series of different images required based on the background of a collaborative team?

The present invention is a solution to aid collaborative story telling using enhanced visual resonance. The present invention solves this problem by analyzing document corpora and metadata of a graphic repository. A CDR model is derived from this analysis which is used to determine appropriate visuals to use in collaborative discourse (e.g., wiki, blogs, etc.). The CDR model is further refined by Human in the Loop analysis of additional viewing measurements. In this way, the present invention selects appropriate images that are effective in communicating an idea or point of view to embed in the document corpora.

In an embodiment, the document corpora and metadata of images in a graphic repository are analyzed. The document corpora is analyzed using, but not limited to, topic modeling, corpus linguistic methods, and readability indices to determine the document content and the target audience. In parallel, the picture metadata is analyzed to determine images that closely align to tagged image metadata. The CDR model is derived from the results of these analyses. The output of the discourse analysis and image metadata analysis are used by the CDR model to determine the images that closely align to the collaborative discourse, i.e., the wiki, blog, or article. In some embodiments, the CDR model is used to determine appropriate visuals that can be embodied as a composition plugin to add to authoring a wiki, blog, or article. In addition, output of the CDR model is applied to the content for corresponding metadata image tagging. Based on the characteristics/metadata of the image and the text, the present invention determines the best mapping between the images and the disclosures when creating the CDR. In an embodiment, when applying the output from the CDR, the present invention determines the best mapping between the content and the tags associated with the image metadata.

In an embodiment, the CDR model is further refined by Human in the Loop analysis of additional viewing measurements. In this step the selection process is refined by obtaining additional user feedback, e.g., wiki/blog comment feedback, etc., and using the feedback to update the CDR model.

FIG. 1 is a functional block diagram illustrating a distributed data processing environment, generally designated 100, suitable for operation of visual resonance program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes visual resonance program 112. In an embodiment, visual resonance program 112 is a program, application, or subprogram of a larger program for visualization resonance for collaborative discourse. In an alternative embodiment, visual resonance program 112 may be located on any other device accessible by computing device 110 via network 120.

In an embodiment, computing device 110 includes information repository 114. In an embodiment, information repository 114 may be managed by visual resonance program 112. In an alternate embodiment, information repository 114 may be managed by the operating system of the device, alone, or together with, visual resonance program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, graphic data, linguistics data, topic analysis data, readability data, image classification data, image metadata, image tag data, user data, system configuration data, and other data that is received by visual resonance program 112 from one or more sources, and data that is created by visual resonance program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Figure 2:
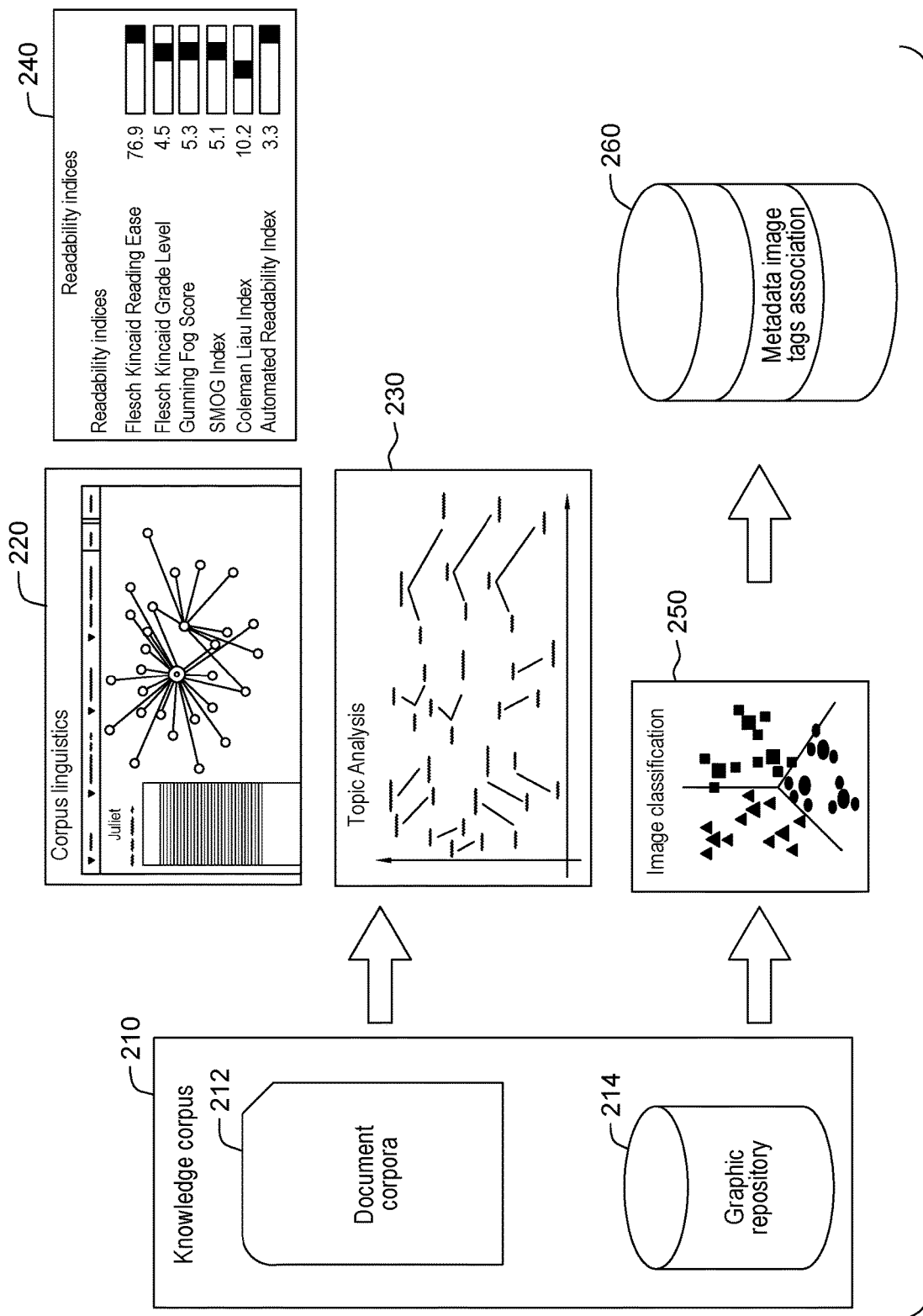
FIG. 2 is an example of analyzing the document corpora and graphic repository, in accordance with an embodiment of the present invention.

FIG. 2 is an example of analyzing the document corpora and graphic repository, in accordance with an embodiment of the present invention. In this example, knowledge corpus 210 is a repository for the document data and graphics images that will be used to derive the CDR model. Knowledge corpus 210 includes document corpora 212, the repository of any or all documents within a collection of documents, and graphic repository 214, a repository of graphics images. In some embodiments, visual resonance program 112 analyzes the document corpora using corpus linguistic methods, including corpus linguistics 220. Corpus linguistic methods may include term frequency, the counting of the number of times a term appears in a document; collocation analysis, which is identifying the combination of two- or three-word terms that appear in a corpus outside of random variation, e.g., "makes sense" is an example of a two-term collocation; and colligation analysis, the grammatical analysis of a collocation to infer whether the tuple or triple is verb noun, noun adjective, verb adverb and so forth.

In some embodiments, visual resonance program 112 analyzes the document corpora using topic analysis, such as topic analysis 230. In some embodiments, the topic analysis technique is Latent Dirichlet Allocation (LDA). LDA traverses a document corpora and determines the key terms in a document. The key terms are denoted by a log-likelihood score. The score values range from 0-1 with a score closer to 1 meaning the term is more likely to be influential within the corpus.

In some embodiments, visual resonance program 112 analyzes the document corpora using readability indices, such as readability indices 240. In an embodiment, visual resonance program 112 determines a readability index for document corpora 212. The automated readability index is a readability test for English texts, designed to gauge the understandability of a text. In the example of FIG. 2, the readability indices include Flesch Kincaid Reading Ease, Flesch Kincaid Grade Level, Gunning Fog Score, SMOG Index, Coleman Liau Index, and Automated Readability Index. Other indices can also be used.

In addition to analyzing the document corpora, visual resonance program 112 analyzes the images in graphic repository 214. In some embodiments, visual resonance program 112 analyzes the images using image classification 250 to determine images that closely align to tagged image metadata. In some embodiments, visual resonance program 112 analyzes the image metadata to determine images that closely align to tagged image metadata. In some embodiments, visual resonance program 112 uses convolutional neural networks (CNNs) to determine images that closely align to the tagged image metadata. Image metadata refers to the textual information that can be embedded within a digital photograph. Such metadata may include tags that may provide a textual description of the photograph. For example, for a photograph of a chair or desk, a plausible tag may be "office furniture" or "office supplies". Although an image can be classified to determine what it is, there is significant value in analyzing text based image metadata tags to infer information about an image. Therefore, in some embodiments, visual resonance program 112 analyzes the image metadata to infer information about the image.

In some embodiments, visual resonance program 112 includes metadata image tags association 260, which is data storage for the image tags created by image classification 250. In an embodiment, metadata image tags association 260 is stored in information repository 114 from FIG. 1.

Figure 3:
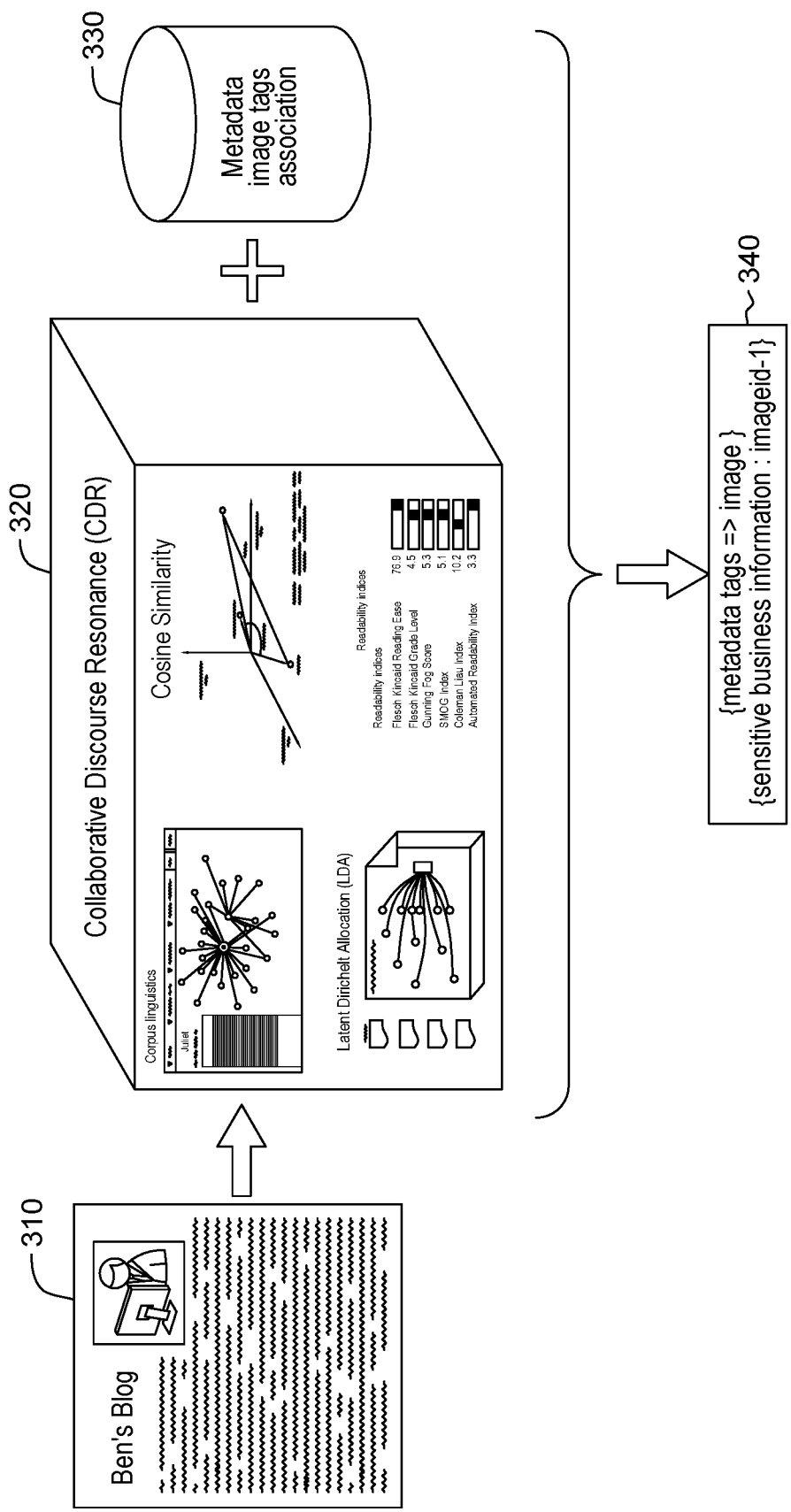
FIG. 3 is an example of deriving the Collaborative Discourse Resonance (CDR) model, in accordance with an embodiment of the present invention.

FIG. 3 is an example of deriving the CDR model, in accordance with an embodiment of the present invention. In this example, collaborative discourse 310 is the input document to be analyzed by visual resonance program 112 to select appropriate graphics images to insert into the document. CDR model 320 is the CDR model constructed by visual resonance program 112 to select appropriate graphics images to insert into the document. In this example, CDR model 320 includes four different analysis techniques, including corpus linguistics 220, topic analysis 230, and readability indices 240 from FIG. 2, as well as cosine similarity, which is a measure of similarity between two non-zero vectors of an inner product space. Metadata image tags association 330 is data storage for the image tags to be used by CDR model 320. This is metadata image tags association 260 from FIG. 2. In an embodiment, metadata image tags association 330 is stored in information repository 114 from FIG. 1.

Output results 340 is a sample of the types of output that may result from the analysis by visual resonance program 112. This sample output contains two types of output, metadata tags linked to an image to add to collaborative discourse 310, and sensitive business information discovered in collaborative discourse 310. The sensitive business information includes a link to an image that was selected from metadata image tags association 330 that was determined, based on the analysis with CDR model 320, to signify an alert to the user of the document. In other words, visual resonance program 112 uses CDR model 320, after discovering sensitive business information in collaborative discourse 310, to select an image from metadata image tags association 330 that the user associates with an alert, and inserts that alert into the document. This process is illustrated in FIG. 4 below.

Figure 4:
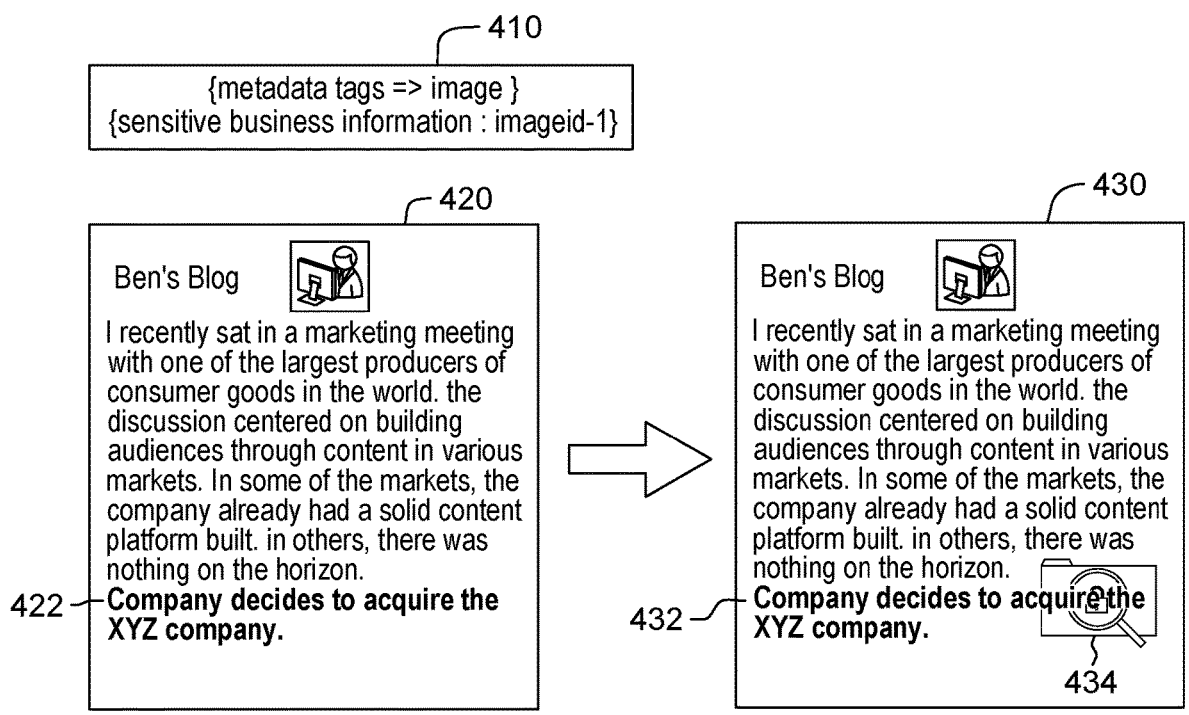
FIG. 4 is an example of using the CDR model to determine appropriate visuals, in accordance with an embodiment of the present invention.

FIG. 4 is an example of using the CDR model to determine appropriate visuals, in accordance with an embodiment of the present invention. In this example, input results 410 is the output of FIG. 3, i.e., output results 340, which will now be used to insert the selected images into the document. Original document 420 is the original document, e.g., collaborative discourse 310 from FIG. 3. In this example, original document 420 is a blog entry. During the analysis of the corpora of original document 420, visual resonance program 112 detected that the blog entry contained sensitive business information 422 (i.e., the sentence "Company decides to acquire the XYZ company"). Visual resonance program 112 then selected alert image 434 from the image repository, e.g., graphics repository 214 from FIG. 2, based upon the image tags stored in the data image tags association, e.g., data image tags association 260 from FIG. 2 or metadata image tags association 330 from FIG. 3, to insert into final document 420. Visual resonance program 112 selected alert image 434 after analyzing images previously selected by the user to indicate an alert. In this way, visual resonance program 112 inserts an image into final document 430 that the user likely will detect as an alert.

Final document 430 is the document after visual resonance program 112 has inserted alert image 434 to final sensitive business information 432. In another embodiment, upon detecting sensitive information in the document corpora, visual resonance program 112 may delete the sensitive information from the document corpora.

Figure 5:
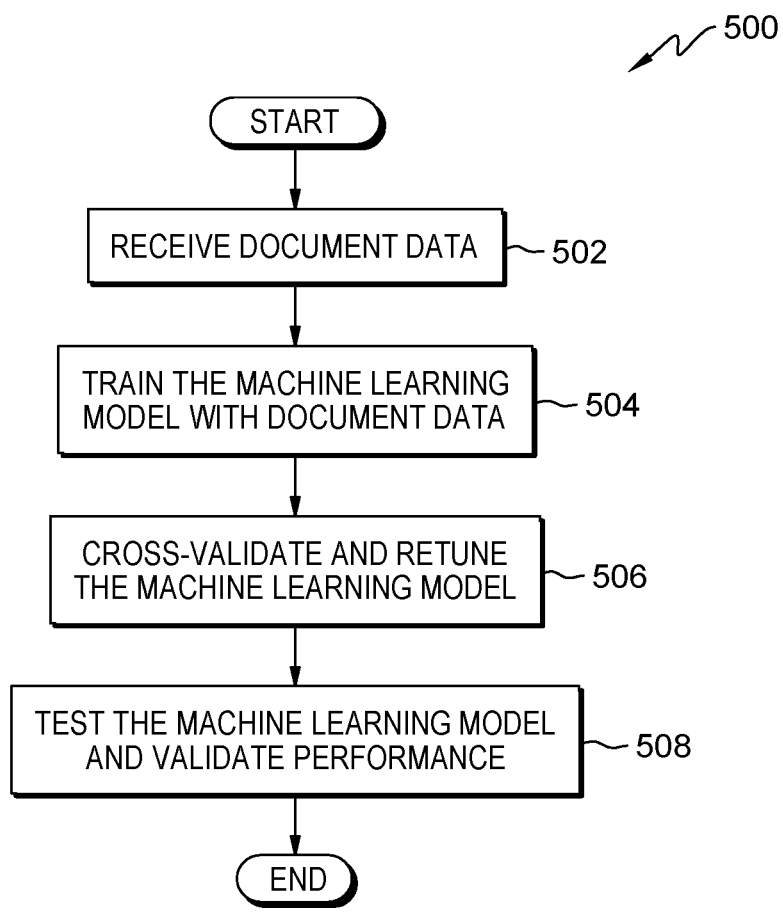
FIG. 5 is the flowchart for the steps for the section of visual resonance program 112 that trains the machine learning model, in accordance with an embodiment of the present invention.

FIG. 5 is the flowchart for the steps for the section of visual resonance program 112 that trains the machine learning model, in accordance with an embodiment of the present invention. In an alternative embodiment, the steps of workflow 500 may be performed by any other program while working with visual resonance program 112. In an embodiment, visual resonance program 112 receives data that is used to train the machine learning model, e.g., CDR model 320 from FIG. 3. In an embodiment, visual resonance program 112 trains the deep learning model with document data received in step 504, i.e., the data from a prior document corpus. In an embodiment, visual resonance program 112 cross-validates and retunes the machine learning model using current data, and cross-validates the efficacy of the model. In an embodiment, visual resonance program 112 runs test data through the machine learning model to validate the performance of the model.

It should be appreciated that embodiments of the present invention provide at least for visualization resonance for collaborative discourse. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Visual resonance program 112 receives document data (step 502). In an embodiment, visual resonance program 112 receives data that is used to train the machine learning model, e.g., CDR model 320 from FIG. 3. In an embodiment, visual resonance program 112 receives the training data from a user. In an embodiment, the data to train the model is essentially a prior document corpus. In another embodiment, visual resonance program 112 retrieves the training data from a knowledge corpus from a document previously analyzed by visual resonance program 112.

Visual resonance program 112 trains the machine learning model with document data (step 504). In an embodiment, visual resonance program 112 trains the deep learning model with document data received in step 504, i.e., the data from a prior document corpus. In an embodiment, visual resonance program 112 trains the machine learning model by inputting the data retrieved from a previous document corpus in step 502 into the machine learning algorithm and derives the model from the results of the training.

Visual resonance program 112 cross-validates and retunes the machine learning model (step 506). In an embodiment, visual resonance program 112 cross-validates the efficacy of the model using current data and then retunes the machine learning model based on the cross-validation results. In an embodiment, visual resonance program 112 compares the results of the tests using prior data with the expected results, and compares the results to a pre-determined threshold. In an embodiment, if the results meet or exceed the pre-determined threshold, then the model is validated. In an embodiment, if the results do not meet the pre-determined threshold, then the model is adjusted based on the results of the test, and visual resonance program 112 again cross-validates the model. This repeats until the results meet or exceed the pre-determined threshold.

Visual resonance program 112 tests the machine learning model and validates its performance (step 508). In an embodiment, after the model has been validated with data from a prior corpus, visual resonance program 112 runs test data through the machine learning model to validate the performance of the model with test data and expected results. In an embodiment, if the percentage of the test results that match the expected results do not meet a predetermined threshold, then visual resonance program 112 returns to step 506 to further retune the machine learning model. In an embodiment, if the results of the validation process meet a predetermined threshold, then visual resonance program 112 ends for this cycle.

Figure 6:
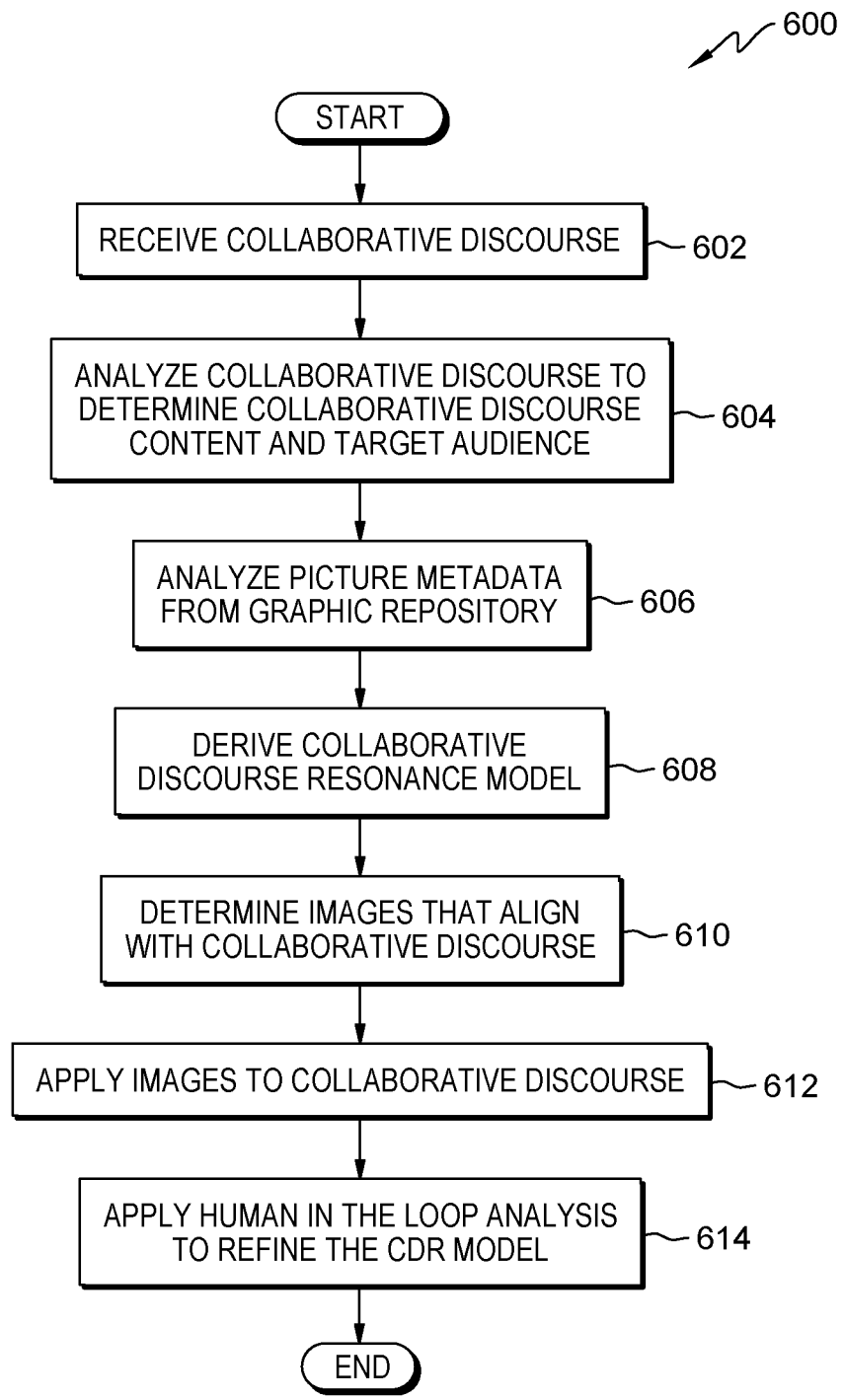
FIG. 6 is the flowchart for the main section of visual resonance program 112, in accordance with an embodiment of the present invention.

FIG. 6 is the flowchart for the main section of visual resonance program 112, in accordance with an embodiment of the present invention. In an alternative embodiment, the steps of workflow 600 may be performed by any other program while working with visual resonance program 112. In an embodiment, visual resonance program 112 receives the collaborative discourse to be analyzed for adding images, e.g., collaborative discourse 310 from FIG. 3. In an embodiment, visual resonance program 112 analyzes the document corpora using topic modeling and corpus linguistic methods, and the readability index to determine the collaborative discourse content and the target audience. In an embodiment, visual resonance program 112 analyzes picture metadata to determine images that closely align to the tagged image metadata. In an embodiment, visual resonance program 112 derives the CDR model based on the analyses performed in the previous steps. In an embodiment, visual resonance program 112 takes the output of the discourse analysis and image metadata analysis to determine the images that closely align to the collaborative discourse. In an embodiment, visual resonance program 112 inserts the images selected in step 610 into the collaborative discourse, e.g., collaborative discourse 310 from FIG. 3. In an embodiment, visual resonance program 112 further refines the CDR model using Human in the Loop analysis of additional viewing measurements.

It should be appreciated that embodiments of the present invention provide at least for visualization resonance for collaborative discourse. However, FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

Visual resonance program 112 receives a collaborative discourse (step 602). In an embodiment, visual resonance program 112 receives the collaborative discourse to be analyzed for adding images, e.g., collaborative discourse 310 from FIG. 3. In an embodiment, the collaborative discourse is received from a user. In another embodiment, visual resonance program 112 receives a link to the collaborative discourse, for example, a link to a blog entry to analyze for possible graphics embedding.

Visual resonance program 112 analyzes the collaborative discourse to determine the content of the collaborative discourse and the target audience (step 604). In an embodiment, visual resonance program 112 analyzes the document corpora using topic modeling and corpus linguistic techniques, and the readability index to determine the collaborative discourse content and the target audience. In an embodiment, visual resonance program 112 uses the results of these analyses to build the machine learning model in step 608 below.

Visual resonance program 112 analyzes picture metadata from the graphic repository (step 606). In an embodiment, visual resonance program 112 analyzes picture metadata to determine images that closely align to the tagged image metadata. In an embodiment the system contains a graphic repository, e.g., graphic repository 214 from FIG. 2, where a set of images have been collected. In an embodiment, visual resonance program 112 utilizes the image classification algorithms to analyze the images and create the metadata tags for the images.

Visual resonance program 112 derives a collaborative discourse resonance model (step 608). In an embodiment, visual resonance program 112 derives the CDR model based on the analyses performed in step 604 and 606. This may include, but is not limited to, corpus linguistics, topic analysis, readability indices, cosine similarity, and image classification.

Visual resonance program 112 determines images that align with the collaborative discourse (step 610). In an embodiment, visual resonance program 112 takes the output of the discourse analysis and image metadata analysis to determine the images that closely align to the collaborative discourse. In some embodiments, visual resonance program 112 uses CNNs to determine images that closely align to the tagged image metadata.

Visual resonance program 112 applies the images to the collaborative discourse (step 612). In an embodiment, visual resonance program 112 inserts the images selected in step 610 into the collaborative discourse, e.g., collaborative discourse 310 from FIG. 3. In some embodiments, visual resonance program 112 determines appropriate visuals that can be embodied as a composition plugin to add wiki, blog, or article authoring. In some embodiments, visual resonance program 112 applies the output of the CDR model to the content for corresponding metadata image tagging.

Visual resonance program 112 applies Human in the Loop analysis to refine the CDR model (step 614). In an embodiment, visual resonance program 112 further refines the CDR model using Human in the Loop analysis of additional viewing measurements. Human in the Loop is a branch of artificial intelligence that leverages both human and machine intelligence to create machine learning models. In this step, visual resonance program 112 can refine the selection process by receiving additional user feedback (e.g., Net Promoter Score, wiki/blog comment feedback etc.) and applying that feedback to refine the CDR model. In an embodiment, visual resonance program 112 then ends for this cycle.

Figure 7:
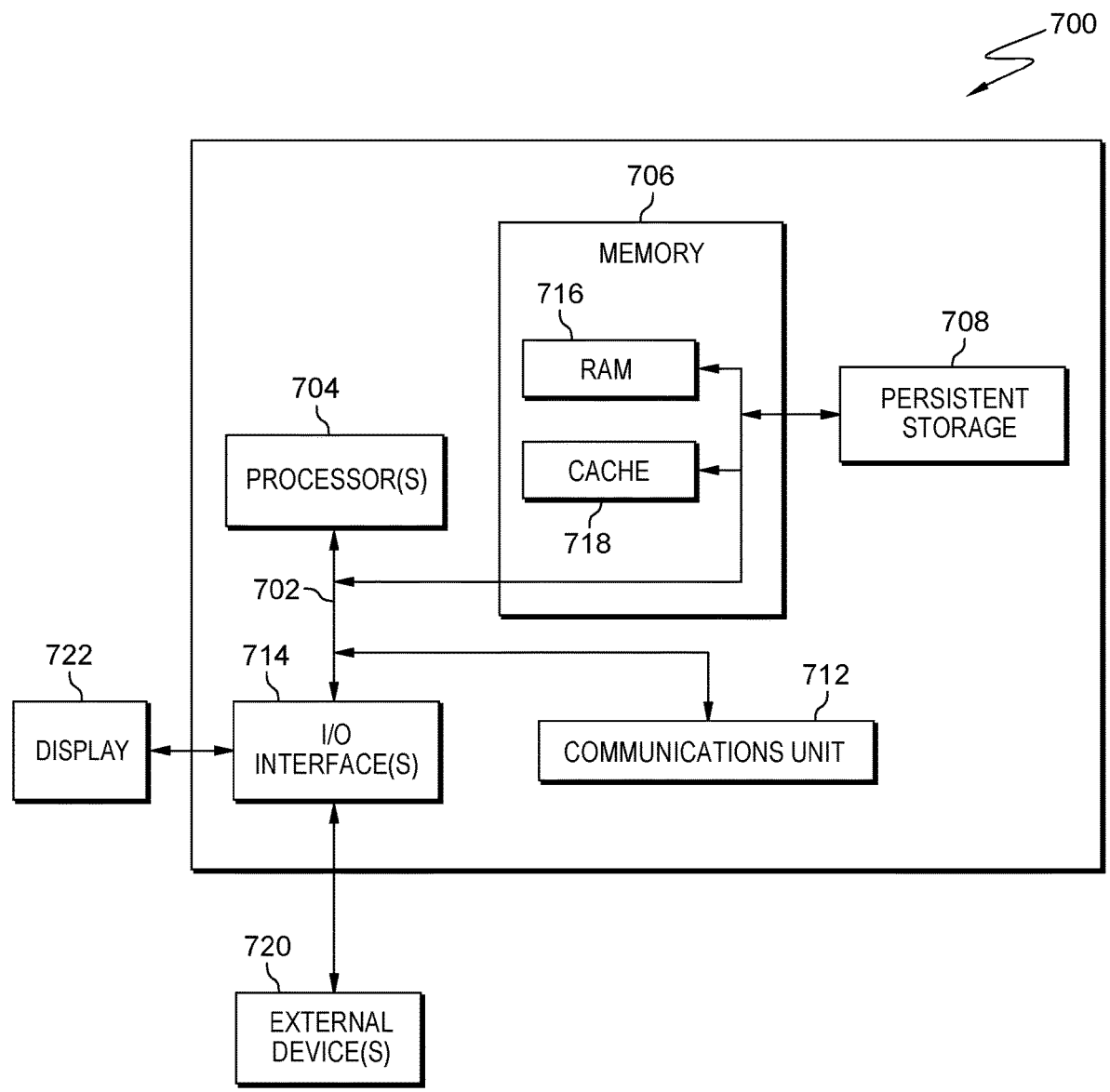
FIG. 7 depicts a block diagram of components of the computing devices executing the visual resonance program within the distributed data processing environment of FIG. 1, in accordance with an embodiment of the present invention.

FIG. 7 is a block diagram depicting components of computing device 110 suitable for visual resonance program 112, in accordance with at least one embodiment of the invention. FIG. 7 displays computer 700; one or more processor(s) 704 (including one or more computer processors); communications fabric 702; memory 706, including random-access memory (RAM) 716 and cache 718; persistent storage 708; communications unit 712; I/O interfaces 714; display 722; and external devices 720. It should be appreciated that FIG. 7 provides only an illustration of one embodiment and does not imply any limitations with regard to the environments in which different embodiments may be implemented. Many modifications to the depicted environment may be made.

As depicted, computer 700 operates over communications fabric 702, which provides communications between computer processor(s) 704, memory 706, persistent storage 708, communications unit 712, and I/O interface(s) 714. Communications fabric 702 may be implemented with any architecture suitable for passing data or control information between processors 704 (e.g., microprocessors, communications processors, and network processors), memory 706, external devices 720, and any other hardware components within a system. For example, communications fabric 702 may be implemented with one or more buses.

Memory 706 and persistent storage 708 are computer readable storage media. In the depicted embodiment, memory 706 comprises RAM 716 and cache 718. In general, memory 706 can include any suitable volatile or non-volatile computer readable storage media. Cache 718 is a fast memory that enhances the performance of processor(s) 704 by holding recently accessed data, and near recently accessed data, from RAM 716.

Program instructions for visual resonance program 112 may be stored in persistent storage 708, or more generally, any computer readable storage media, for execution by one or more of the respective computer processors 704 via one or more memories of memory 706. Persistent storage 708 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. In the context of some embodiments of the present invention, the source of the various input data may be physically remote to computer 700 such that the input data may be received, and the output similarly transmitted via communications unit 712.

I/O interface(s) 714 allows for input and output of data with other devices that may be connected to computer 700. For example, I/O interface(s) 714 may provide a connection to external device(s) 720 such as a keyboard, a keypad, a touch screen, a microphone, a digital camera, and/or some other suitable input device. External device(s) 720 can also include portable computer readable storage media such as, for example, thumb drives, portable optical or magnetic disks, and memory cards. Software and data used to practice embodiments of the present invention, e.g., visual resonance program 112, can be stored on such portable computer readable storage media and can be loaded onto persistent storage 708 via I/O interface(s) 714. I/O interface(s) 714 also connect to display 722.

Display 722 provides a mechanism to display data to a user and may be, for example, a computer monitor. Display 722 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for collaborative discourse, the computer-implemented method comprising:
   responsive to receiving a collaborative discourse, analyzing, by one or more computer processors, a document corpora of the collaborative discourse to determine a set of content in and a target audience of the document corpora of the collaborative discourse;
   analyzing, by the one or more computer processors, a picture metadata for each image of one or more images in a graphic repository to determine whether each image of the one or more images in the graphic repository align with a set of tagged image metadata;
   deriving, by the one or more computer processors, a machine learning model from a result of the analysis of the document corpora and the analysis of the picture metadata;
   selecting, by the one or more computer processors, one or more appropriate images of the one or more images in the graphic repository based on the machine learning model, wherein the one or more appropriate images align with the collaborative discourse, and wherein the one or more appropriate images can be embodied as a composition plugin to the collaborative discourse to increase user attention to the set of content;
   applying, by the one or more computer processors, the one or more appropriate images selected to the collaborative discourse; and
   responsive to receiving a feedback from a user on the one or more appropriate images, refining, by the one or more computer processors, the machine learning model by applying a Human in the Loop analysis of additional viewing measurements.

2. The computer-implemented method of claim 1, wherein
   the document corpora of the collaborative discourse is analyzed using at least one of one or more topic modeling techniques, one or more corpus linguistic methods, and one or more readability indices.

3. The computer-implemented method of claim 1, wherein selecting the one or more appropriate images of the one or more images in the graphic repository based on the machine learning model further comprises:
   determining, by the one or more computer processors, whether the one or more appropriate images of the one or more images in the graphic repository that align to the collaborative discourse can be embedded into the collaborative discourse; and
   responsive to determining that the one or more appropriate images of the one or more images in the graphic repository that align to the collaborative discourse can be embedded into the collaborative discourse, embedding, by the one or more computer processors, the one or more appropriate images into the collaborative discourse.

4. The computer-implemented method of claim 1, further comprising:
   determining, by the one or more computer processors, whether the collaborative discourse contains a sensitive information;
   responsive to determining that the collaborative discourse contains the sensitive information, selecting, by the one or more computer processors, one or more alert images of the one or more images in the graphic repository based on the picture metadata, wherein the picture metadata indicates the one or more alert images are associated with previous alerts; and embedding, by the one or more computer processors, the one or more alert images into the collaborative discourse.

5. The computer-implemented method of claim 1, wherein the collaborative discourse includes at least one of a wiki, a blog, and an article.

6. A computer program product for collaborative discourse, the computer program product comprising one or more computer readable storage media and program instructions stored on the one or more computer readable storage media, the program instructions including instructions to:

responsive to receiving a collaborative discourse, analyze a document corpora of the collaborative discourse to determine a set of content in and a target audience of the document corpora of the collaborative discourse;

analyze a picture metadata for each image of one or more images in a graphic repository to determine whether each image of the one or more images in the graphic repository align with a set of tagged image metadata;

derive a machine learning model from a result of the analysis of the document corpora and the analysis of the picture metadata;

select one or more appropriate images of the one or more images in the graphic repository based on the machine learning model, wherein the one or more appropriate images align with the collaborative discourse, and wherein the one or more appropriate images can be embodied as a composition plugin to the collaborative discourse to increase user attention to the set of content;

apply the one or more appropriate images selected to the collaborative discourse; and responsive to receiving a feedback from a user on the one or more appropriate images, refine the machine learning model by applying a Human in the Loop analysis of additional viewing measurements.

7. The computer program product of claim 6, wherein the document corpora of the collaborative discourse is analyzed using at least one of one or more topic modeling techniques, one or more corpus linguistic methods, and one or more readability indices.

8. The computer program product of claim 6, wherein selecting the one or more appropriate images of the one or more images in the graphic repository based on the machine learning model further comprises one or more of the following program instructions, stored on the one or more computer readable storage media, to:

determine whether the one or more appropriate images of the one or more images in the graphic repository that align to the collaborative discourse can be embedded into the collaborative discourse; and responsive to determining that the one or more appropriate images of the one or more images in the graphic repository that align to the collaborative discourse can be embedded into the collaborative discourse, embed the one or more appropriate images into the collaborative discourse.

9. The computer program product of claim 6, further comprising one or more of the following program instructions, stored on the one or more computer readable storage media, to:

determine whether the collaborative discourse contains a sensitive information;

responsive to determining that the collaborative discourse contains the sensitive information, select one or more alert images of the one or more images in the graphic repository based on the picture metadata, wherein the picture metadata indicates the one or more alert images are associated with previous alerts; and embed the one or more alert images into the collaborative discourse.

10. The computer program product of claim 6, wherein the collaborative discourse includes at least one of a wiki, a blog, and an article.

11. A computer system for collaborative discourse, the computer system comprising:

one or more computer processors;

one or more computer readable storage media; and program instructions stored on the one or more computer readable storage media for execution by at least one of the one or more computer processors, the stored program instructions including instructions to:

responsive to receiving a collaborative discourse, analyze a document corpora of the collaborative discourse to determine a set of content in and a target audience of the document corpora of the collaborative discourse;

analyze a picture metadata for each image of one or more images in a graphic repository to determine whether each image of the one or more images in the graphic repository align with a set of tagged image metadata;

derive a machine learning model from a result of the analysis of the document corpora and the analysis of the picture metadata;

select one or more appropriate images of the one or more images in the graphic repository based on the machine learning model, wherein the one or more appropriate images align with the collaborative discourse, and wherein the one or more appropriate images can be embodied as a composition plugin to the collaborative discourse to increase user attention to the set of content;

apply the one or more appropriate images selected to the collaborative discourse; and responsive to receiving a feedback from a user on the one or more appropriate images, refine the machine learning model by applying a Human in the Loop analysis of additional viewing measurements.

12. The computer system of claim 11, wherein the document corpora of the collaborative discourse is analyzed using at least one of one or more topic modeling techniques, one or more corpus linguistic methods, and one or more readability indices.

13. The computer system of claim 11, wherein selecting the one or more appropriate images of the one or more images in the graphic repository based on the machine learning model further comprises one or more of the following program instructions, stored on the one or more computer readable storage media, to:

determine whether the one or more appropriate images of the one or more images in the graphic repository that align to the collaborative discourse can be embedded into the collaborative discourse; and responsive to determining that the one or more appropriate images of the one or more images in the graphic repository that align to the collaborative discourse can be embedded into the collaborative discourse, embed the one or more appropriate images into the collaborative discourse.

14. The computer system of claim 11, further comprising one or more of the following program instructions, stored on the one or more computer readable storage media, to:

determine whether the collaborative discourse contains a sensitive information;

responsive to determining that the collaborative discourse contains the sensitive information, select one or more alert images of the one or more images in the graphic repository based on the picture metadata, wherein the picture metadata indicates the one or more alert images are associated with previous alerts; and embed the one or more alert images into the collaborative discourse.

15. The computer system of claim 11, wherein the collaborative discourse includes at least one of a wiki, a blog, and an article.

\* \* \* \* \*